Patented June 16, 1942

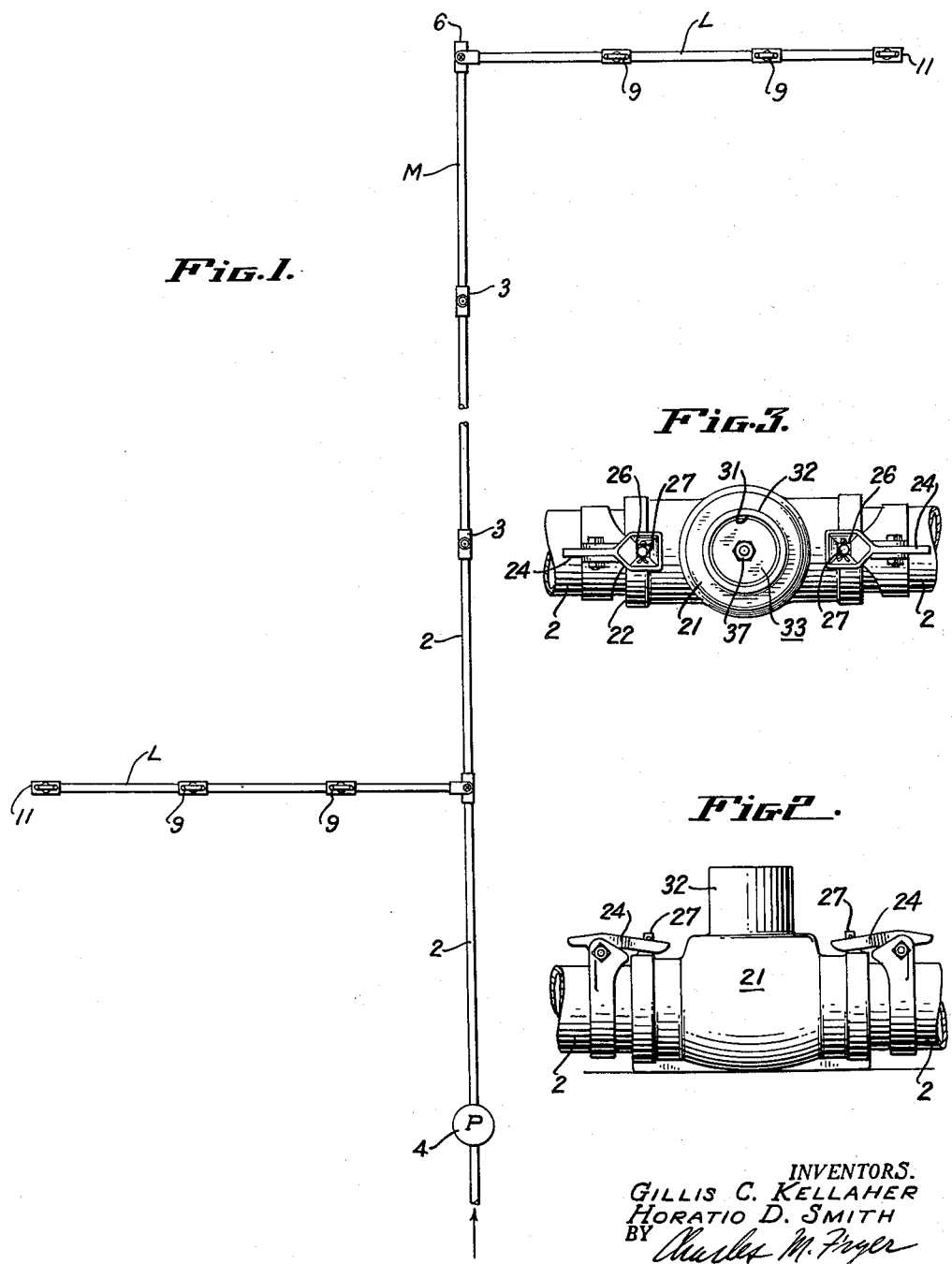

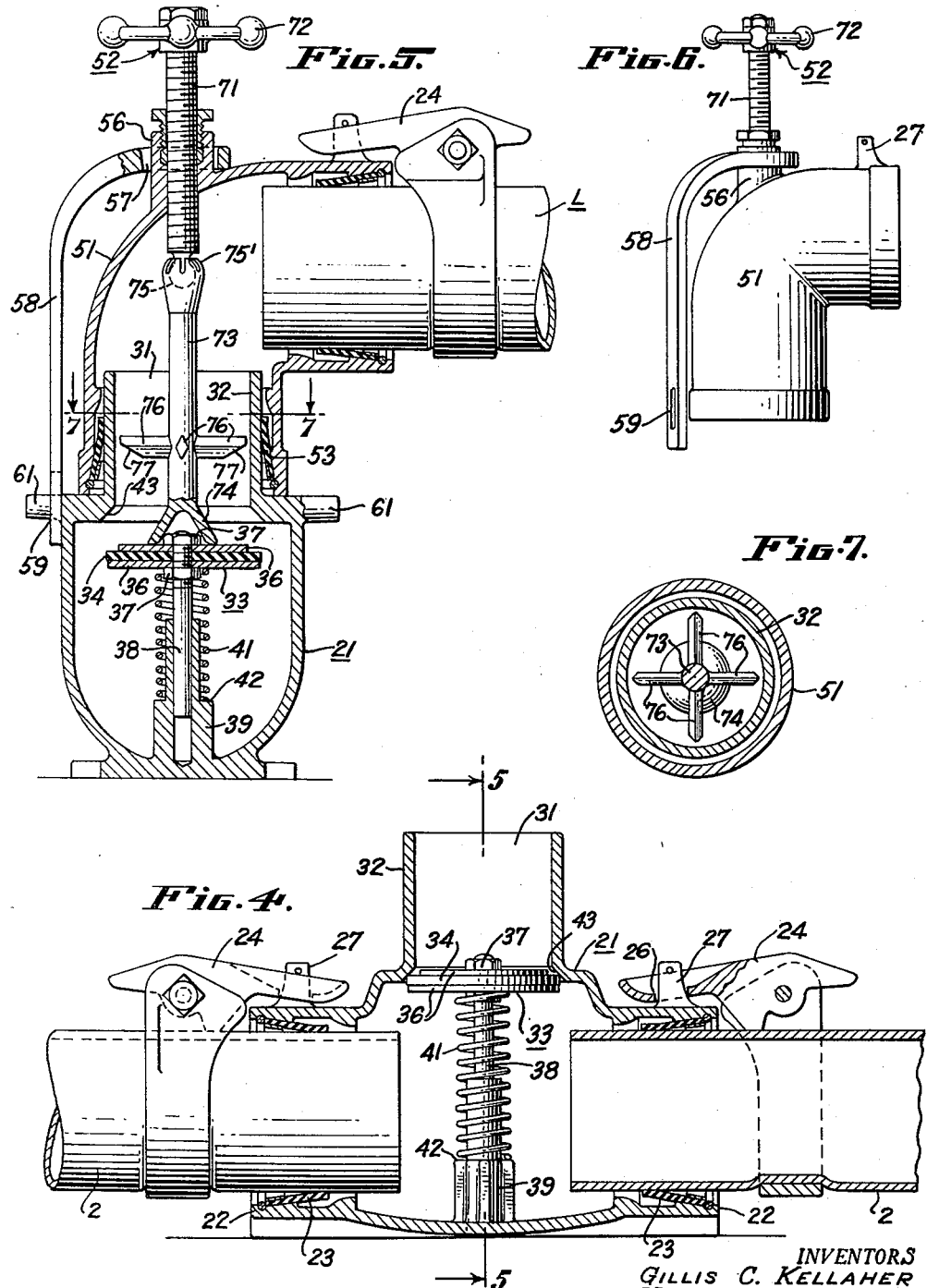

2,286,623

UNITED STATES PATENT OFFICE 2,286,623

FLUID CONTROL MEANS FOR PORTABLE IRRIGATING SYSTEMS

Gillis C. Kellaher, Portland, Oreg., and Horatio D. Smith, Seattle, Wash., assignors to R. M. Wade & Co., Portland, Oreg., a corporation of Oregon Application Feb. 9, 1940, Serial No. 318,082

11 Claims. (Cl. 137—78)

Our invention relates to portable knock-down piping systems adapted for irrigation of land, and more particularly to improved coupler and valve means for controlling flow of fluid from such systems.

Systems of the character to which our invention is particularly adapted usually comprise relatively long pipes or conduits which may be readily detachably connected to couplers. A relatively large number of such couplers and pipes are generally employed and form a relatively straight main line for flow of water from a source. The couplers are usually of the T-type; and the pipes are adapted for connection in the opposite open ends thereof. An intermediate open portion is formed in each coupler, which has heretofore been plugged with a removably mounted cap or plug to prevent escape of fluid in its flow through the main line.

When it was desired to irrigate areas to either side of the main line, the cap or plug in the selected coupler was removed, and lateral extension piping connected to the intermediate open portion of the coupler; such extension piping comprising an elbow adapted for connection to the coupler and a laterally extending pipe line connectable to the elbow. To reduce expense, it is the practice to employ only a few lateral elbows, usually two, which are adapted for attachment and disconnection to selective of the couplers as various areas of the ground become irrigated.

Because of the removable plug which leaves an opening when disconnected from the associated coupler, it has heretofore been necessary each time a plug was attached or removed, when the extension means was to be connected or disconnected, to shut off the flow of water through the system to prevent loss of water. Also, when the piping was laid on a hill and a plug removed from the coupling for connection of lateral extension means, water in the main piping flowing down hill would run out through the resultant opening which also caused a loss.

Our invention is designed to overcome the described difficulties in prior systems having the old type couplers, and has as its object among others, the provision of an improved coupler in which valve means is provided by which the flow of water may be readily controlled through the extension opening of the coupler; in which, when the lateral elbow is disconnected from the coupler, the valve means automatically shuts; in which valve actuating mechanism is not located in the coupler per se, thus providing an economical arrangement; and by which lateral extensions may be changed without the necessity of having to shut off the water or without losing any water, as has been necessary heretofore. Other objects of our invention will become apparent from a perusal of the following description thereof.

In general, the coupler of our invention is provided with the usual open ends for connection of main line pipes or conduits thereto, and with an intermediate open portion for connection of an elbow or any other suitable extension means to provide for lateral escape of fluid to the lateral extension line. The flow of fluid through such intermediate outlet is controlled by resiliently pressed valve means; and actuating means, preferably manually operable, is provided in the extension elbow for opening the valve means against the action of the resilient means which tends to close it. As a result, when the extension means is removed from the coupler, the valve means will automatically close and prevent escape of fluid. Means is provided, in cooperation with the valve actuating means, to enable proper centering and connection thereof with respect to the valve means.

Reference is made to the drawings for a more detailed description of our invention, in which:

Fig. 1 is a more or less schematic view of a portable knock-down irrigating system to which our invention is particularly applicable.

Fig. 2 is a side elevational view of our preferred form of coupler; portions of pipes being shown connected in the open ends thereof.

Fig. 3 is a plan view of the structure shown in Fig. 2.

Fig. 4 is a longitudinal vertical sectional view through the coupler of our invention, illustrating pipes connected thereto and the automatic shut-off valve with which it is provided.

Fig. 5 is a vertical section taken in a plane indicated by line 5—5 of Fig. 4, illustrating extension means connected to the coupler and the coupler valve held open by its actuating means.

Fig. 6 is a side elevational view of the extension elbow.

Fig. 7 is a section taken in a plane indicated by line 7—7 in Fig. 5.

The system to which our invention is particularly applicable is usually formed of conduits or piping 2 detachably connected together by means of couplers 3 which may be of any suitable construction; although we prefer to employ couplers of the general type illustrated in our assignee's co-pending application by Gillis C.

Kellaher, Serial No. 215,821, filed June 25, 1938, issued as Patent No. 2,244,396, dated June 3, 1941 Usually, as is illustrated in Fig. 1, pipes 2 are connected together to form a main line M into which water for irrigating purposes is pumped from any suitable source by means of pump 4. Such main line may be of any suitable length depending upon the territory being irrigated. It is not unusual for the main line to be 3,000 or 4,000 feet long; the remote end 6 thereof being generally plugged by any suitable means to prevent escape of water.

For irrigating purposes, detachable lateral extensions L are generally connected to selected of main line couplers 3, and are moved along the main line as various areas therealong become irrigated. Such lateral extensions are also formed of piping detachably connected by couplers which usually have sprinklers 9 attached thereto. As with respect to the main line, the remote ends 11 of the lateral extensions are plugged up to prevent escape of water. Usually only two of such portable lateral extensions are generally connected to the main line.

As is illustrated in the patent previously referred to, the coupler comprises a casing 21, open at each of its opposite ends 22, in which are secured suitable gasket sleeves 23 made of resilient material, such as rubber, which are adapted to seal against the pipes 2 insertable into the openings; the water in casing 21 serving to press the gaskets 23 tightly around pipes 2 in sealing contact therewith. Such pipes and coupler ends 22 are non-threaded to provide flexible, telescopic connections therebetween; the pipes being thus readily manually insertable and removable from the coupler by relative endwise sliding movement; and means is provided to form an automatic latched or locked connection between the coupler and the pipes. Such means preferably comprises a pivotably mounted latch lever 24 connected adjacent the end of each pipe, having an eye 26 adapted to engage either of lugs or projections 27 on the ends of the coupler. The surfaces around eye 26 are tapered, and projection 27 is tapered to cause the latch lever to ride over the projection and readily engage the eye when the pipe is inserted endwise. Such arrangement is described in greater detail in the aforementioned patent.

To allow for flow of water into extension means adapted for connection to the coupler, the latter is provided with an intermediate open portion or outlet 31 formed usually in the top thereof and which is bounded by cylindrical non-threaded flange 32. This is the outlet which has heretofore been closed by a plug insertable therein when a lateral extension was not connected thereto. To overcome the previously described disadvantages with respect to such arrangement, we employ within the coupler resiliently pressed valve means comprising valve member 33, which may be of any suitable construction but which we preferably form of a rubber disk 34, held between metal plates 36 mounted by nuts 37 on a stem 38 which is slidable in boss 39 integral with the bottom of the coupler. A spring 41 is interposed between a shoulder 42 on boss 39 and the bottom plate 36, to urge automatically the valve towards closed position wherein rubber disk 34 can engage a conical valve seat 43, as is illustrated in Fig. 4. It is to be noted that the upper metal plate 36 is of less diameter than the lower plate 36, which is substantially co-extensive with rubber disk 34, to enable such disk to bear resiliently against the valve seat 43 and thus form a tight seal when the valve is closed.

From the preceding, it is seen that the outlet 31 will always be maintained closed to prevent escape of water, unless the valve is positively moved against the action of spring 41. For opening the valve, we provide valve actuating means 52 mounted in an extension conduit member, in the form of elbow 51 adapted for flexible detachable connection over outlet 31 by relative endwise sliding movement and having flexible gasket 53 adapted to engage the coupler flange 32 to seal against water leakage when the elbow is connected. Means is provided to lock the elbow to the coupler comprising a cylindrical boss 56 formed on the top of elbow 51, over which is loosely journalled, by means of enlarged aperture 57 therein, an L-shaped latching member 58, having at its lower end an enlarged elongated opening 59 adapted to engage either of bosses 61 projecting from opposite sides of the coupler to thus enable the elbow to be extended to either side of the coupler. The axis of boss 56 coincides with the axis of outlet 31; and because of the loose journalling of boss 56 in aperture 57, the elbow can be turned freely about cylindrical flange 32 even when the elbow is locked, to enable angular adjustment of the elbow for controlling the direction for outflow of water. When water reaches elbow 51, the pressure thereof tends to cause tilting of the elbow, but the loose connection of the elbow locking means allows such tilting to occur to thus preclude binding. Lateral piping L is adapted for connection to the outlet of the elbow by means similar to that previously described, as is illustrated in Fig. 5.

The valve actuating means 52 is constructed to enable automatic centering thereof with respect to valve member 33 when elbow 51 is connected to the coupler and to eliminate binding, to thus enable easy opening of the valve even though the coupler and the elbow are not precisely aligned; it comprises threaded stem 71 screwed into boss 56 so as to move rectilinearly towards and away from the valve, and having at its upper end handle wheel 72 by which the stem may be manually turned. Flexibly or yieldably connected to stem 71 is an interponent element in the form of another stem or rod 73 which is formed at its lower end with a bell-shaped recessed portion 74 adapted to provide centering means for engagement with the centering protuberance which the upper nut 37 on the valve forms. Any suitable means may be employed for providing the flexible connection between stem 71 and rod 73, but we preferably utilize a ball 75 formed at the lower end of stem 71 engaging in a socket 75' at the upper end of rod 73; such upper end of rod 73 being crimped over the ball.

For properly guiding such rod 73, when it is inserted through outlet 31, laterally extending centering guide fingers 76 are formed on rod 73, which are adapted to engage the inside of flange 32 to thus insure that the bell-shaped portion 74 on rod 73 will engage the protuberance 37 on the valve. The lower sides of guide fingers 76 are provided with upwardly slanting end portions 77 to facilitate sliding over the top edge of flange 32, and hence preclude the guides from becoming trapped at the top of the coupler. Because of the flexibility of the valve actuating means and the self-centering thereof, the pressure which it exerts when opening the valve will be directly over the valve stem 38 to avoid binding.

From the preceding, it is seen that by virtue of the valve in the coupler no water can escape from the coupler when the extension elbow 51 is disconnected, as the spring 41 serves to close the valve automatically. When the extension elbow is connected to the coupler and the valve is opened by turning of wheel 72, water will flow out through the lateral extension line. This arrangement enables water to flow out of any lateral extension line which may be connected to a coupler, while any other extension line may be moved from one coupler to another, without shutting off the pump 4. Should the main line be located on a hill, water will not drain out of the main line through a coupler from which an extension line may have been disconnected because of the automatic closing of the coupler valve immediately upon disconnection of the extension elbow.

At times when a pump is located a long distance from an extension line which is to be changed from one coupler to another, unless water is allowed to flow continuously when the pump is operating, the pump will become overheated. In the arrangement of our invention employing a plurality of lateral extension lines, it is not necessary to shut off the pump to prevent such overheating because, as previously explained, water may flow continuously through one extension while another is being changed. Furthermore, in prior systems having the old type couplers provided with plugs, it was necessary to shut off the pump because if allowed to operate, not only would water be lost, but also connection of an extension line or a plug to the outlet of a coupler was rendered impossible against the outflow of water therefrom. Thus, it is seen that in the arrangement of our invention, the pump need not be shut off unless the operator desires to do so.

It is to be noted that economy results by virtue of the fact that the valve actuating mechanism is not provided in the coupler per se but in the lateral elbow adapted for connection thereto, because, as was previously explained, a system of the character described is generally provided with not more than two of such elbows for connection of the lateral extensions, and hence valve actuating mechanisms need not be supplied for all couplers of the system.

We claim:

1. A T-coupler for a portable knock-down irrigating system having opposite open ends adapted to be detachably connected to main line piping and an intermediate cylindrical open portion, a disk valve for controlling flow of fluid through said intermediate cylindrical open portion and having a central protuberance thereon, and resilient means for urging said valve toward closed position; and an extension conduit member comprising an elbow adapted to be detachably and telescopically connected to said intermediate cylindrical open portion by relative endwise sliding movement and having valve actuating mechanism to enable facile operation of the valve without the necessity of the coupler and the conduit member being precisely alined, said valve actuating mechanism comprising a member threaded in said elbow, and a stem member flexibly connected to said threaded member at one end and having in its opposite end a recess in which said protuberance is adapted to engage.

2. A coupler for a portable knock-down irrigating system having a spring pressed valve urged to close position by said spring; and a conduit member adapted for telescopic detachable connection to said coupler by relative endwise sliding movement and having valve actuating mechanism, said actuating mechanism being flexible to enable facile operation of the valve without the necessity of the coupler and the conduit member being precisely alined and having means associated therewith to obtain proper centering thereof with respect to the valve.

3. An extension elbow adapted to be telescopically and detachably connected to a valved coupler and having manually operable valve actuating mechanism for the coupler valve, said actuating mechanism comprising a plurality of parts flexibly connected together and having means associated therewith to obtain proper centering thereof with respect to the valve.

4. In a portable knock-down irrigating system; a coupler for connecting main line piping having an open portion, and a spring pressed valve for controlling flow of fluid through said open portion; and a conduit member having an end portion for telescopic detachable connection with said open portion by relative endwise sliding movement, and mechanism for actuating said valve; said actuating mechanism comprising a plurality of flexibly connected parts to enable facile operation of the valve without the necessity of the coupler and the conduit member being precisely alined, and having means associated therewith to obtain proper centering thereof with respect to the valve.

5. A conduit member adapted to be flexibly and detachably connected to a valved coupler for a portable knock-down irrigating system, having manually operable valve actuating mechanism; said actuating mechanism comprising a manually turnable member threaded in said conduit member, a stem member, and a flexible connection between said stem member and said threaded member.

6. A portable knock-down irrigating system of the type adapted to be laid over the ground comprising a plurality of T-couplers each of which is provided with tubular ends telescopically detachably connected to piping, said piping and couplers providing a main line for flow of water; each of said couplers having also an intermediate tubular part, and valve mechanism therein constructed to close automatically; and a plurality of conduit members; each of said conduit members being telescopically detachably connected to an intermediate tubular part of a coupler to provide a branch line for flow of water from said main line and having flexible valve actuating mechanism for enabling facile opening of the valve mechanism of a coupler connected thereto irrespective of whether such parts are in exact alinement; the number of said conduit members being less than the number of said couplers.

7. In combination, a coupler having an open connecting portion, a valve in said coupler for controlling the flow of fluid through said connecting portion, and means for yieldably holding said valve closed; and an extension conduit member having means adapted for connection to said coupler connecting portion in fluid tight relation thereto, and valve actuating mechanism carried by said extension conduit member and including an actuating element mounted to move in a fixed path on said extension conduit, an interponent engageable with said valve for operating the valve in response to movement of said actuating element, and means flexibly connecting said interponent to said actuating element to enable facile operation of the valve without the necessity of the coupler and the conduit member being precisely alined.

8. In combination, a coupler having an open connecting portion, a valve in said coupler for controlling the flow of fluid through said connecting portion, and means for yieldably holding said valve closed; and an extension conduit member having means adapted for detachable telescopic connection to said coupler connecting portion in fluid tight relation thereto, and valve actuating mechanism carried by said extension conduit member and including a manually operable actuating stem mounted on said extension conduit member to move rectilinearly generally towards and away from said valve, an interponent stem extending in the same general direction as said actuating stem in end-to-end relation thereto, and means flexibly connecting the adjacent ends of said stems to allow angular movement of said interponent stem relative to said actuating stem and thus enable the free end of said interponent stem to be engaged with said valve to provide for opening of said valve by said actuating stem without binding and without the necessity of said coupler and said conduit member being precisely alined.

9. In combination, a coupler having an open connecting portion, a valve in said coupler for controlling the flow of fluid through said connecting portion, means for yieldably holding said valve closed, and locating means on said valve adapted to be engaged by valve actuating mechanism for opening the valve; and an extension conduit member having means adapted for connection with said coupler connecting portion in fluid tight relation thereto, and valve actuating mechanism carried by said extension conduit member and including an actuating element mounted to move on said extension conduit member, an interponent having a centering portion adapted to engage said locating means, and a flexible ball and socket connection between said interponent and said actuating element to enable facile operation of the valve without the necessity of the coupler and the conduit member being precisely alined.

10. A fluid conduit extension apparatus adapted to be connected to a coupler equipped with a valve, said apparatus comprising a conduit member constructed to have fluid tight connection with such coupler; and valve actuating mechanism carried by said conduit member including an actuating element mounted to move in a fixed path on said conduit member, an interponent having a portion adapted to operatively engage the valve of a coupler to which said conduit member is adapted to be connected, and means flexibly connecting said interponent to said actuating element to enable facile operation of the valve without the necessity of the coupler and the conduit member being precisely alined.

11. A fluid conduit extension apparatus adapted to be telescopically connected to a coupler equipped with a valve, said apparatus comprising a conduit member constructed to have fluid tight connection with such coupler; and valve actuating mechanism carried by said conduit member including an actuating stem rectilinearly movable on said conduit member, an interponent stem extending in the same general direction as said actuating stem in end-to-end relation thereto, and means flexibly connecting the adjacent ends of said stems to permit angular movement of said interponent stem relative to said actuating stem for enabling facile operation of such valve without the necessity of the coupler and the conduit member being precisely alined.

GILLIS C. KELLAHER.
HORATIO D. SMITH.